United States Patent [19]

Braun et al.

[11] Patent Number: 4,867,300
[45] Date of Patent: Sep. 19, 1989

[54] ROUND LINK CHAIN FOR CHAIN SCRAPER CONVEYORS

[75] Inventors: Gert Braun; Ernst Braun, both of Essen, Fed. Rep. of Germany

[73] Assignee: Halbach & Braun Industrieanlagen, Fed. Rep. of Germany

[21] Appl. No.: 154,942

[22] Filed: Feb. 11, 1988

[30] Foreign Application Priority Data

Feb. 11, 1987 [DE] Fed. Rep. of Germany ....... 3704176

[51] Int. Cl.$^4$ .............................................. B65G 19/24
[52] U.S. Cl. ..................................... 198/731; 198/733
[58] Field of Search ............... 198/731, 733, 712, 834; 474/210, 232–234; 59/5, 84, 90

[56] References Cited

U.S. PATENT DOCUMENTS 4,282,971  8/1981  Becker .................................. 198/834
4,372,619  2/1983  Braun .................................... 474/210

FOREIGN PATENT DOCUMENTS 694515    7/1940  Fed. Rep. of Germany ...... 198/834
3433715   4/1985  Fed. Rep. of Germany ...... 198/731
2127127   4/1984  United Kingdom ................ 198/731

Primary Examiner—Joseph E. Valenza
Attorney, Agent, or Firm—McGlew & Tuttle

[57] ABSTRACT

A round link chain having vertical links with a smaller pitch than the horizontal links. The combined pitch of each vertical link and horizontal link in the configuration of a size 42 round link chain corresponds to the combined pitch of two chain links of a size 38 round link chain, so that in consideration of the stout vertical links, it is possible to use a size 42 round link chain in place of a size 38 round link chain in conventional chain scraper conveyors with limited height of passage for the carrying run and the slack run, and this without altering the pitch diameter of the chain sprockets.

5 Claims, 3 Drawing Sheets

ROUND LINK CHAIN FOR CHAIN SCRAPER CONVEYORS

BACKGROUND OF THE INVENTION

This invention relates in general to excavation equipment and in particular to a new and useful round link chain particularly for a single chain belt for scraper chain conveyors.

The invention particularly concerns a round link chain, particularly a single chain belt for chain scraper conveyors, with vertical and horizontal links, both having chain link sides and chain link arches joining the sides, and the vertical links having flattened exterior chain link sides.

A round link chain for mining conveyors and especially middle chain scraper conveyors includes vertical links with a flattened cross section in contrast to a round cross section, but only at their parallel chain link sides, while the arches joining the sides have a round circular cross section. Furthermore, the vertical links have a constant cross section size, which is the same as the cross section size of the horizontal links, while the pitch of the vertical and the horizontal links is identical. A round link chain of this type should be suitable for use in chain scraper conveyors, particularly middle chain scraper conveyors with a rolling cam, even when rather large drive performance requires a thicker chain, while the vertical links cannot exceed the side profile of the conventional conveyor trough in either the carrying run or the slack run. In such cases where the height of the trough depends on the working of the mine and consequently the carrying run and the slack run are restricted in the height of the passage, it is no longer possible to use a normal round link chain with links sufficiently strong to withstand the greater traction forces. For this reason, twin middle chain conveyors have already been tried as a solution to the problem. The round link chain, however, is not free of drawbacks, inasmuch as the use of found link chains with stronger links also requires use of another chain starwheel or sprocket. For the pitch of the chain links changes with the thickness of the sprocket. On account of the identical pitch of the vertical and the horizontal chain links, which increases with larger chain thickness, it is necessary to use sprockets with a different, that is, a larger pitch diameter. This, again, calls for a modification or even a replacement of a machine frame built onto the dump end of a chain scraper conveyor to provide for the mounting of the sprocket.

In another application, that is, the guiding of a coal cutting machine which spans the trough of a chain scraper conveyor as a gantry, the drive unit arranged ar the gob end has a chain wheel engaging with a round link chain, the chain being laid in a runner section with engagement slots for the wheel. The round link chain includes long horizontal links and short vertical links, the clear pitch of the vertical links up to a predetermined free motion corresponding to twice the diameter of the horizontal links. This is supposed to substantially exclude a pulling apart or pushing together of the chain links, and a proper pitchwise meshing of wheel and chain is even achieved when the chain scraper conveyor travel over saddles, declivities or curves and is used at a steep or semi-steep stratum. These known measures, however, do not affect the problems, mentioned at the outset, concerning the use of round link chains to take up larger traction forces.

SUMMARY OF THE INVENTION

The invention provides a round link chain, particularly a single chain belt for chain scraper conveyors which have thicker than usual chain links and can be driven satisfactorily even with chain sprockets designed for thinner chain links. The chain links can retain the same pitch diameter, or can be passed round the chain sprockets because with its vertical links, it does not exceed the side profile of conventional conveyor troughs either in the carrying run or the slack run, and moreover, its horizontal links afford a better buttressing of the pushers secured thereon.

According to the invention, a round link chain has vertical links with a smaller pitch than the horizontal links. The combined pitch of each vertical and horizontal link corresponds to the combined pitch of two standardized chain links of a lower size category (and thus with a smaller link diameter), and the cross section of the arches of the vertical links is chosen to be larger than the cross section of the flattened chain link sides. According to the invention, the vertical links form low short compact links, whereas the horizontal links are long and flat, buttressing the pushers secured thereon. Since the combined pitch of each vertical and horizontal link corresponds to the combined pitch of two standardized chain links of identical size to each other, but of a lower size category or thinner dimensions, the invented round link chain can be driven even when using thicker chain links by chain sprockets retaining the same pitch diameter, or the links can be passed around the sprockets even though they have been designed for chain links of thinner dimension. All that is necessary is to enlarge the chain pockets for the horizontal links on the sprocket. An embodiment of the invention includes horizontal links with a link diameter of $d_H = 42$ mm, a width of $b_H = 138$ mm, and a pitch of $t_H = 152$ mm, and vertical links with a width of height of $b_v = 110$ mm and a pitch of $t = 122$ mm. Thus, at least on the basis of the horizontal links, this is a so-called size 42 round link chain, although having a combined pitch of horizontal and vertical link of 274 mm, identical to the combined pitch of a size 38 round link chain as per a German Standards (DIN). Consequently, according to the invention, a size 42 round link chain of the invention can be exchanged for a size 38 round link chain without also requiring a changing of the chain wheels and, ultimately, the machine frame. Instead, this change does not affect the principal dimension of the chain wheels or the standard size of the machine frame. But the size 42 chain of the invention is suitable to handle much larger traction forces. Its vertical links are so flat that the chain can be used in conventional conveyor troughs with limited height of passage in the carrying run and the slack run. Of special importance in this respect, moreover, is the fact that the longer horizontal links—longer in relation to a size 38 round link chain—are subject to less specific surface pressure in the chain pockets of the sprockets, since their bearing surface is larger than that of the horizontal links of a size 38 round link chain. Therefore, a reduction in wear and tear of the chain pockets, in particular, and thus of the sprockets is achieved.

Another consideration is the fact that the relatively long horizontal links perform the function of buttresses, since a larger righting moment is imparted to pushers attached thereto, especially when traveling over a rolling cam. In fact, this improves the overall kinematics in traveling over a rolling cam Furthermore, the running-in properties of the pushers are optimized, because the shorter vertical links produce a more favorable progression in relation to the central radius of the conveyor through in the region of a rolling cam. Furthermore, the short and compressed vertical links are characterized by especially slight deformation and elongation, so that chain lengthening is minimized. Accordingly, there are important advantages achieved by the invention.

Other characteristic features of the invention are discussed hereafter. Thus, the invention specifies that the arches of the vertical links have the largest cross section in their apex region, grading uniformly from h re into the chain link sides. Hence, an abrasion cushion exists in the region of the chain link arches, which extends the lifetime of the chain. In such eventuality, the direction of the fibers is naturally taken into account during the forging of the vertical links in a die, that is, the lengthwise direction of the chain link sides or the circumferential direction of the chain link arches. The cross section of the chain link sides, and that of the chain link arches, are of different thickness in the case of the vertical links, particularly in order to confer stability on the more heavily stressed chain segments. In this respect, it is possible to select the cross sections of the chain link arches of the vertical links and even the chain link sides larger than the uniform cross section of the horizontal links.

In accordance with another embodiment of the invention, the vertical links have a round circular inner surface in the region of their chain link arches and a rectangular cross section in the middle region of their chain link sides, the width of the chain link sides being equal to the inner diameter of the chain link arches and slightly larger than the cross sectional diameter of the horizontal links or their chain link arches, and therefore the chain link sides of the vertical links in the region of their rectangular cross section form shoulders at either side to prevent clenching of the standing-up horizontal links. This measure has the effect that the horizontal links have continuously unobstructed freedom of motion in the horizontal plane, and can be pushed into the vertical links in the horizontal plane or form angles. But if the horizontal links attempt to stand up, they strike against the shoulders, which are necessarily formed by the rectangular cross-section of the side of the vertical links. For this purpose, the distance between the chain link sides of the vertical links is chosen to be sufficiently narrow in relation to the arches of the horizontal links. The invention thus produces a round link chain whose links are virtually protected against clenching by the configuration of the vertical links and this is another particular advantage of the invention.

Accordingly, it is an object of the invention to provide an improved round link chain especially for a single chain belt for a chain scraper conveyor which comprises a chain which has interengaged normally vertical links and normally horizontal links having spaced apart sides joined by arches at each end and with the vertical links having flattened sides or flattened exterior surfaces. They also have a smaller pitch than the horizontal links wherein the vertical and horizontal links have cumulative pitches equal to the cumulative pitch of two standardized chain links of a lower size category, the vertical links having a cross section of the chain link arches which is chosen to be larger than the cross section of the chain link sides.

A further object of the invention is to provide a round link chain, particularly a single chain belt for chain scraper conveyors which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWING

In the Drawings

FIG. 7 is a partial vertical sectional view CD through the line CD of FIG. 1 of a vertical link, showing a horizontal link standing up and striking against the particular rectangular cross section of the vertical link side.

DESCRIPTION OF THE PREFERRED EMBODIMENTS

Figure 1:
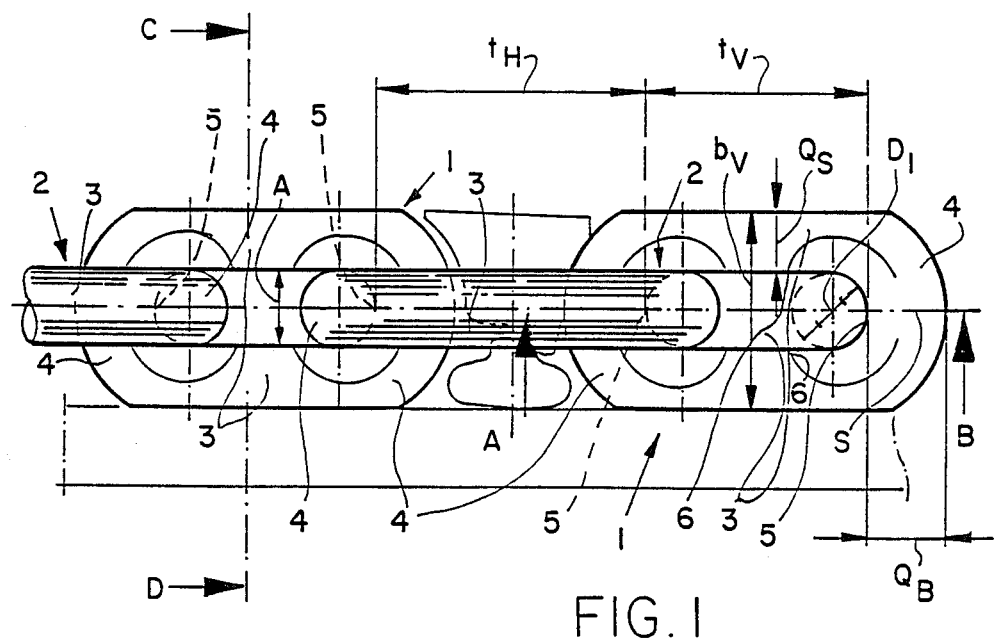
FIG. 1 is a side elevational view of a segment of a round link chain with a pusher constructed in accordance with the invention.
Figure 2:
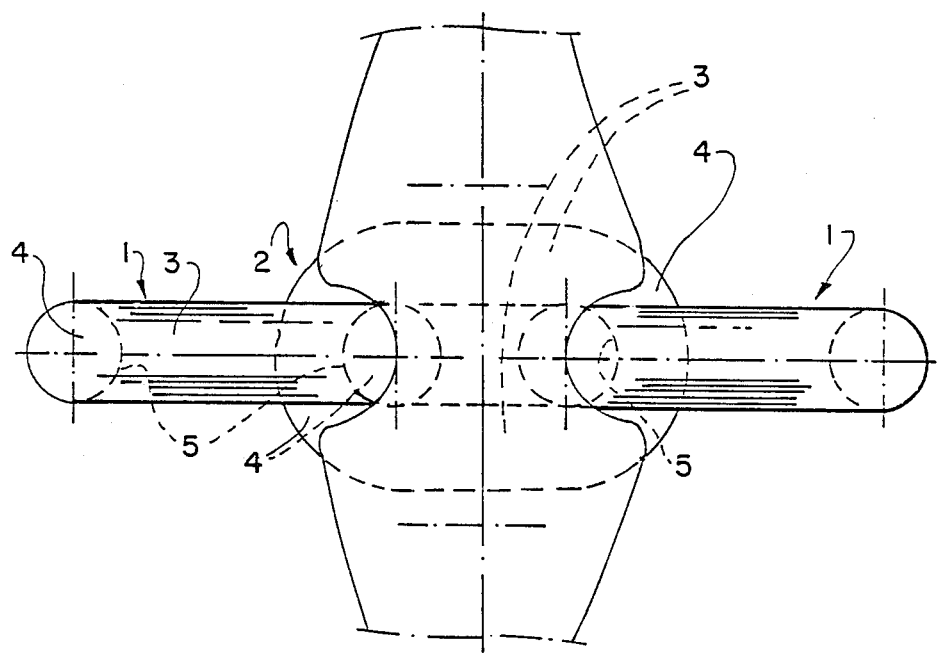
FIG. 2 is a a partial top plan view of the chain in FIG. 1 overlying the pusher.

Referring to the drawings, in particular, the invention embodied therein comprises a round link chain especially a single chain belt for a chain scraper conveyor which comprises a chain which has interengaged normally vertical links generally designated 1 and horizontal links generally designated 2.

The figures show a round link chain, in particular, a single chain belt for chain scraper conveyors or single-chain scraper conveyors. This chain, in its basic construction, has vertical links generally designated 1 and horizontal links generally designated 2, each having chain link sides 3 and chain link arches 4, connecting the ends of the sides. The vertical links 1 have chain link sides 3 with flat exterior surfaces. The vertical links 1 have a smaller pitch $t_V$ than the horizontal links 2, with pitch $t_H$. In accordance with the invention, the combined pitch of each vertical link 1 and horizontal link 2 corresponds to the combined pitch of two standard chain links of identical size, belonging to a lower size category. Also, the vertical links 1 have a cross section $Q_B$ of each of the chain link arches, or end walls 4 which is larger than the cross section $Q_S$ of the flattened chain link sides 3. Furthermore, the arches 4 of the vertical links 1 nave their largest cross section in an apex region or central portion S. The cross section diminishes uniformly into the chain link sides 3. Moreover, it is possible for the cross section $Q_B$ of the arches 4 of the vertical links 1 and possibly also that of the chain link sides 3 to be larger than the circular cross section of the horizontal links 2 which is advantageously uniform.

The vertical links 1, in the region of their arches 4, have a round circular inner surface The link 1 has a wall or middle region between their sides 3 of a rectangular cross section $Q_S$. The width b between the exterior edges of he sides 3 is equal to the maximum cross sectional diameter $D_Q$ of the arches 4. Furthermore, the free distance A between the chain link sides or edges 3 is equal to the inner diameter $D_I$ of the chain link arches 4 and, moreover, only slightly larger than the cross sectional diameter of the horizontal links 2 or their arches. In this way, the chain link sides 3 of the vertical links 1 in the region of their rectangular cross section $Q_S$ form shoulders 6 at either side, prevent clenching of standing-up horizontal links 2.

Figure 3:
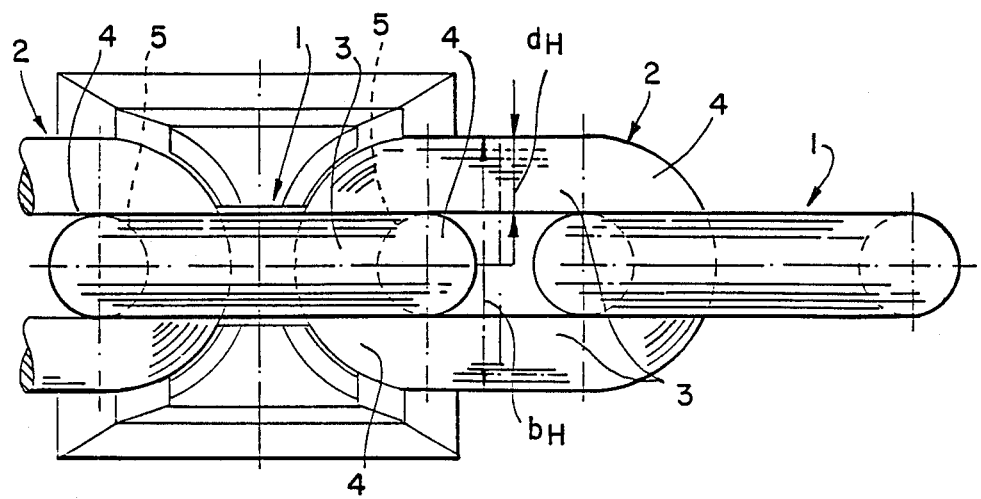
FIG. 3 is a partial top plan view similar to FIG. 2 but without the pusher and with the contour of a sprocket tooth being shown.
Figure 4:
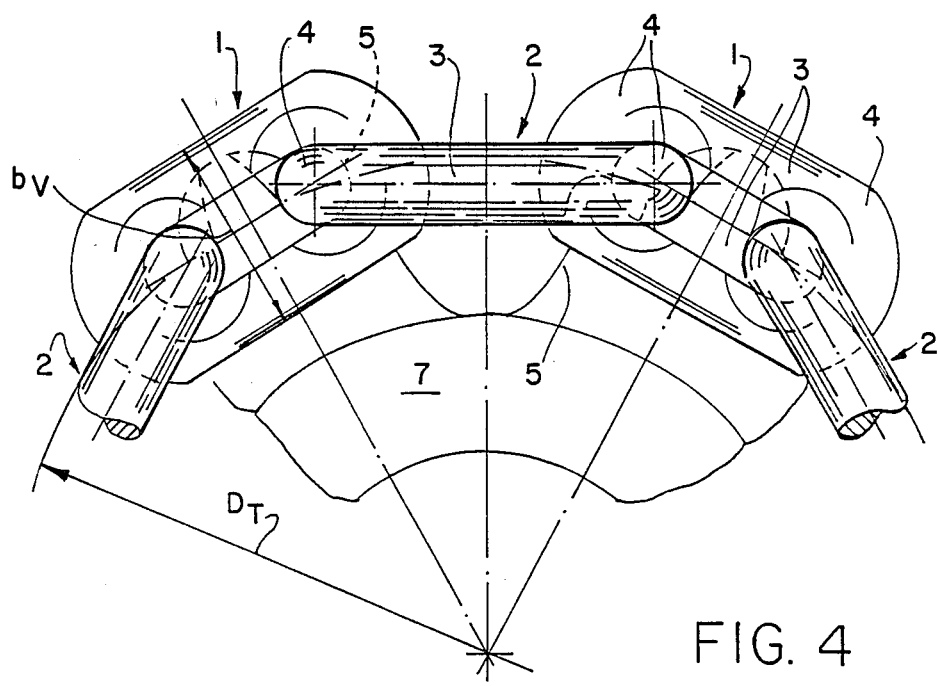
FIG. 4 is a partial side elevational view of a segment of a round link chain as per the invention shown traveling around a chain wheel.
Figure 5:
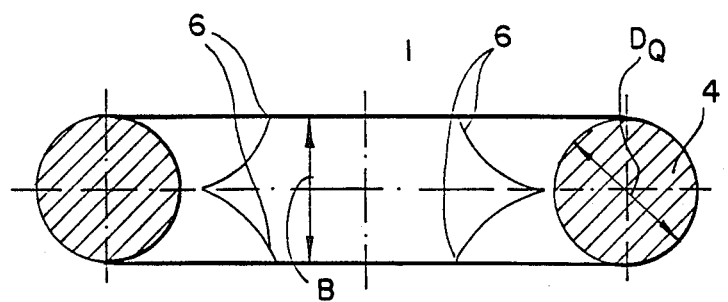
Figure 6:
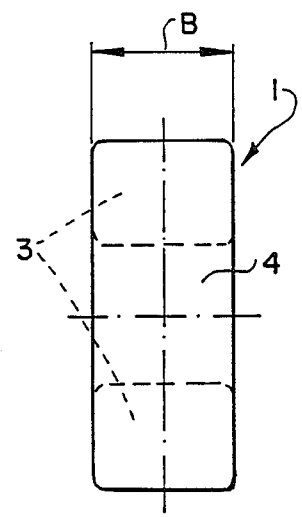
FIG. 6 is a side and elevational view of a vertical link.
Figure 7:
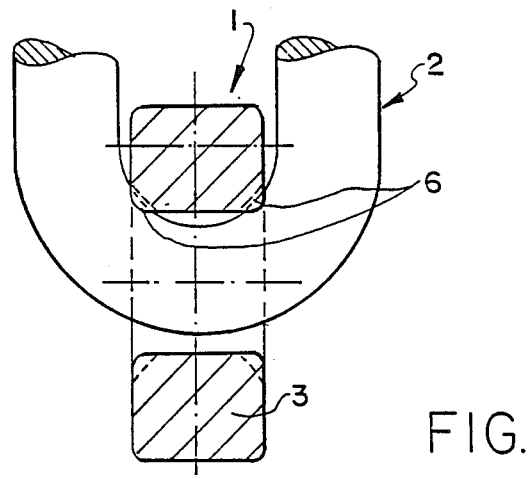
FIG. 7 is a section taken along the line AB of FIG. 1 through a vertical link.

In the example shown, the horizontal links 2 have a diameter of $d_H$ (FIG. 3)=42 mm, a width of $b_H$=138 mm, and a pitch of $t_H$=152 mm, whereas the vertical links 1 have a width of height of $n_v$=110 mm and a pitch of $t_V$=122 mm, so that the combined pitch of each vertical link 1 and horizontal link 2 corresponds to the combined pitch of a size 38 round link chain as per the DIN, namely 274 mm. Hence, a round link chain as per the invention in the configuration of a size 42 chain can be used in place of a size 38 round link chain as per DIN, without requiring a change in the pitch diameter $D_T$ of the chain wheels 7.

While specific embodiments of the invention have been shown and described in detail to illustrate the application of the principles of the invention, it will be understood that the invention may be embodied otherwise without departing from such principles.

What is claimed is:

1. A round link chain for chain scraper conveyors, comprising a chain having interengaged normally vertical links and normally horizontal links, each of said vertical and horizontal links having spaced apart chain link sides joined by arches at each end, said vertical links having sides with flattened exteriors and having a smaller pitch than said horizontal links, each vertical link and each horizontal link having a cumulative pitch which is equal to the cumulative pitch of two standardized chain links of a lower size category, said vertical links having a cross section of said arches which is larger than the cross section of the chain link sides.

2. A round link chain, according to claim 1, wherein said vertical links have arches with round circular inner surfaces centrally between the sides of said links and have a rectangular cross section ($Q_S$), the width of said chain link sides being equal to the maximum cross sectional diameter of said chain link arches, a free distance between the chain link sides being equal to the inner diameter of said chain link arches and slightly larger than the cross sectional diameter of said horizontal links and said horizontal chain link arches, whereby said chain link sides of said vertical links in the region of their rectangular cross section form stopping surfaces (6) at either side against the clenching of said horizontal links where they assume a standing-up position.

3. A round link chain according to claim 1 wherein said horizontal links have a link diameter of $d_H$=42 mm, a width $b_H$=138 mm, and a pitch of $t_H$=152 mm, and the vertical links (1) ave a width or height of $b_v$=110 mm and a pitch of $t_v$=122 mm.

4. A round link chain for chain scraper conveyors, comprising a chain having interengaged normally vertical links and normally horizontal links, each of said vertical and horizontal links having spaced apart chain link sides joined by arches at each end, said vertical links having sides with flattened exteriors and having a smaller pitch than said horizontal links, each vertical link and each horizontal link having a cumulative pitch which is equal to the cumulative pitch of two standardized chain links of a lower size category, said vertical links having a cross section of said arches which is larger than the cross section of the chain link sides, wherein said chain link arches of said vertical links have a larger cross section in the vicinity of an apex region defined centrally between said sides and which cross section diminishes uniformly toward each side.

5. A round link chain for chain scraper conveyors, comprising a chain having interengaged normally vertical links and normally horizontal links, each of said vertical and horizontal links having spaced apart chain link sides joined by arches at each end, said vertical links having sides with flattened exteriors and having a smaller pitch than said horizontal links, each vertical link and each horizontal link having a cumulative pitch which is equal to the cumulative pitch of two standardized chain links of a lower size category, said vertical links having a cross section of said arches which is larger than the cross section of the chain link sides, wherein said cross section of said chain link arches of said vertical link and also the cross section of the sides of said vertical links is chosen to be larger than the cross section of said horizontal links.

* * * * *